United States Patent [19]

Sudoh

[11] Patent Number: 5,168,396
[45] Date of Patent: Dec. 1, 1992

[54] ROTARY HEAD TYPE MAGNETIC TAPE RECORDING AND REPRODUCING APPARATUS

[75] Inventor: Kengo Sudoh, Hiroshima, Japan

[73] Assignee: Sharp Kabushiki Kaisha, Osaka, Japan

[21] Appl. No.: 575,476

[22] Filed: Aug. 31, 1990

[30] Foreign Application Priority Data

Sep. 4, 1989 [JP] Japan .................................. 1-228802

[51] Int. Cl.$^5$ ................................................ G11B 5/09
[52] U.S. Cl. .......................................... 360/51; 360/64
[58] Field of Search ............................. 360/51, 32, 64

[56] References Cited

U.S. PATENT DOCUMENTS 5,051,848 9/1991 Ishii et al. ............................. 360/64

FOREIGN PATENT DOCUMENTS 2163589 2/1986 United Kingdom .
2188766 10/1987 United Kingdom .

OTHER PUBLICATIONS

Article from I.E.E.E. Transactions entitled "A New Multi-Functional Digital Servo LSI for Home VCR", Aug. 1987; No. 3, pp. 210-218.

English Abstract of Japanese Laid-Open Patent Appln. 62-266755.
English Abstract of Japanese Laid-Open Patent Appln. 63-121158.
English Abstract of Japanese Laid-Open Patent Appln. 62-209711.

Primary Examiner—Vincent P. Canney

[57] ABSTRACT

A coefficient setting circuit sets, in registers, coefficients corresponding to a position of each magnetic heads on a rotary drum. A counter circuit counts the number of pulses of a first reference clock signal employed as a reference signal for rotational control of the rotary drum. Comparison circuits compare the coefficients, set in registers, with a count value of the counter circuit and outputs reset pulses r1 and r2 when a match is detected between the set coefficients and the count value. In response to these reset pulses r1 and r2, counter circuits are reset to start the counting operation of a second reference clock signal. Consequently, decoders output timing pulses for controlling the timing of recording or reproducing operations for each magnetic head. The coefficients set by coefficient setting circuit are altered in accordance with alterations in the position of each magnetic head or the shape of the rotary drum, resulting in appropriate timing pulses.

6 Claims, 8 Drawing Sheets

ROTARY HEAD TYPE MAGNETIC TAPE RECORDING AND REPRODUCING APPARATUS

BACKGROUND OF THE INVENTION

1. Field of the Invention

The present invention relates to a rotary head type magnetic tape recording and reproducing apparatus having plural pairs of rotary heads.

2. Description of the Background Art

In magnetic tape recording and reproducing apparatus for digitizing a sound signal, an image signal and so on to record/reproduce these digitized signals on a recording medium such as a magnetic tape, a digital signal, in general, requires a wider frequency band compared to an analog signal which is not digitized. For record in high density a digital signal having the high-frequency band, such a method is provided the digital signal is recorded by employing a magnetic tape recording and reproducing apparatus using rotary heads to be employed in home video tape recorders and the like.

This rotary head type magnetic tape recording and reproducing apparatus includes an analog/digital converter (hereinafter referred to as A/D converter) for converting a supplied analog signal to a digital signal, a memory having a buffer function for temporarily storing the converted digital signal, a data format generating circuit for forming a predetermined data format based on the digital signal stored in the memory, and a controller for controlling these elements. An output of the data format generating circuit is modulated to be supplied to the rotary heads and then recorded on the magnetic tape lapped around the rotary heads.

A clock generating circuit for generating a plurality of clock signals having different frequencies is provided in the controller. The A/D converter, memory, data format generating circuit, a motor for driving the rotary heads and so forth each have of their operations controlled in response to each of the clock signals generated from the clock generating circuit.

Figure 7:
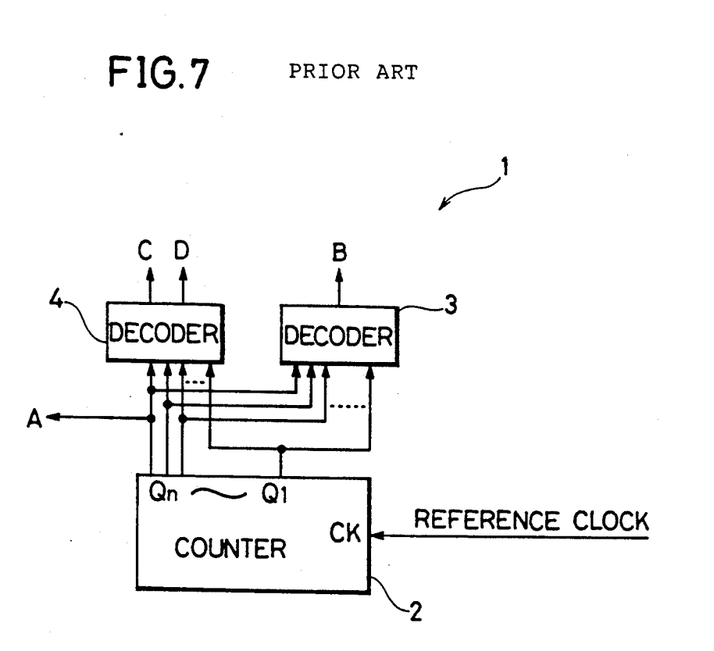
FIG. 7 is a block diagram showing an electrical configuration of a typical conventional clock generating circuit.

FIG. 7 is a block diagram showing an electrical configuration of a typical conventional clock generating circuit. A clock generating circuit 1 includes a counter circuit 2 to be implemented by, for example, an n-bit binary counter, and two decoders 3 and 4. Counter circuit 2 counts the number of pulses of a reference clock signal to be supplied, so as to apply count outputs of a plurality of bits each having different periods to two decoders 3 and 4.

A sampling clock signal B is outputted from decoder 3 to the A/D converter. Decoder 4 outputs a slot clock signal C to the data format generating circuit and a read clock signal D to the memory. A most significant bit signal from counter circuit 2, i.e., a signal obtained by frequency-dividing the reference clock signal by a frequency dividing ratio of $2^n$ is applied as a synchronizing clock signal A of the rotary heads to the motor.

Figure 8A:
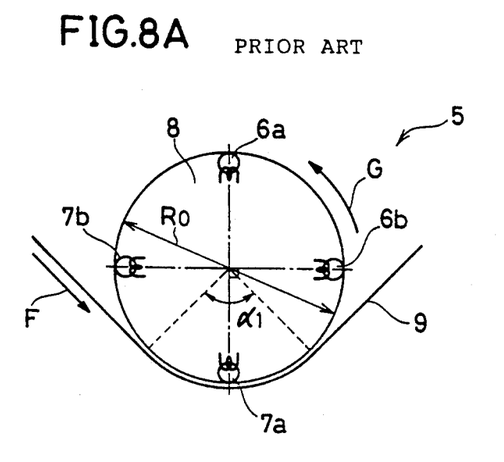
FIG. 8A is a diagram showing the schematic structure of a rotary head apparatus including a rotary drum having a diameter R0.

FIG. 8A is a diagram schematically showing a rotary head apparatus 5 on which plural pairs of heads are mounted. A rotary drum 8 having a diameter R0 is mounted with two magnetic heads 6a and 6b for recording and two magnetic heads 7a and 7b for reproduction. A spacing of 90° (the angle of mounting) is provided between any adjacent recording magnetic heads 6a and 6b and reproducing magnetic heads 7a and 7b. One reproducing magnetic head 7a is used as a monitor head for reproducing data recorded on a magnetic tape 9 by one recording magnetic head 6a immediately after the data is recorded and then checking whether or not the data is correctly recorded on the tape. Similarly, the other reproducing magnetic head 7b is used as a monitor head corresponding to the other recording magnetic head 6b.

Magnetic tape 9 is lapped around rotary drum 8 at a lap angle $\alpha 1$ (90° in FIG. 8A). Magnetic tape 9 moves at a speed Vt in the direction of an arrow F, while rotary drum 8 rotates at a rotating speed Vd in the direction of an arrow G. Since tape moving speed Vt is sufficiently low compared to drum rotating speed Vd, a tracing speed at which each of magnetic heads 6a, 6b, 7a and 7b traces on magnetic tape 9 is approximately equal to drum rotating speed Vt.

Figure 8B:
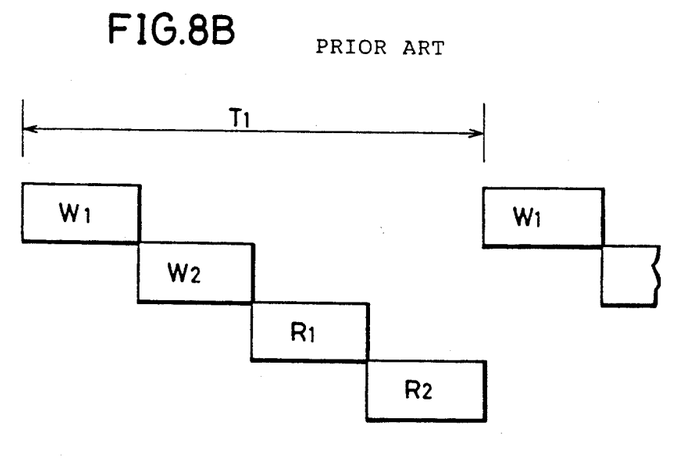
FIG. 8B is a diagram showing a tracing timing of the rotary head apparatus shown in FIG. 8A.

FIG. 8B is a diagram showing to timing of each magnetic heads 6a, 6b, 7a and 7b traces on magnetic tape 9. In a period T1 in which rotary drum 8 makes one revolution, one of magnetic heads 6a, 6b, 7a and 7b starts tracing corresponding track each time rotary drum 8 rotates 90°. Since the mount angle of each magnetic head and the lap angle $\alpha 1$ of magnetic tape 9 are both 90° in FIG. 8A, a time that a preceding magnetic head ends tracing is coincident with a time that the succeeding magnetic head starts tracing. In FIG. 8B, a designation W1 denotes a signal recorded by recording magnetic head 6a; W2 denotes a signal recorded by recording magnetic head 6b; R1 denotes a signal reproduced by reproducing magnetic head 7a; and R2 denotes a signal reproduced by reproducing magnetic head 7b.

Figure 9A:
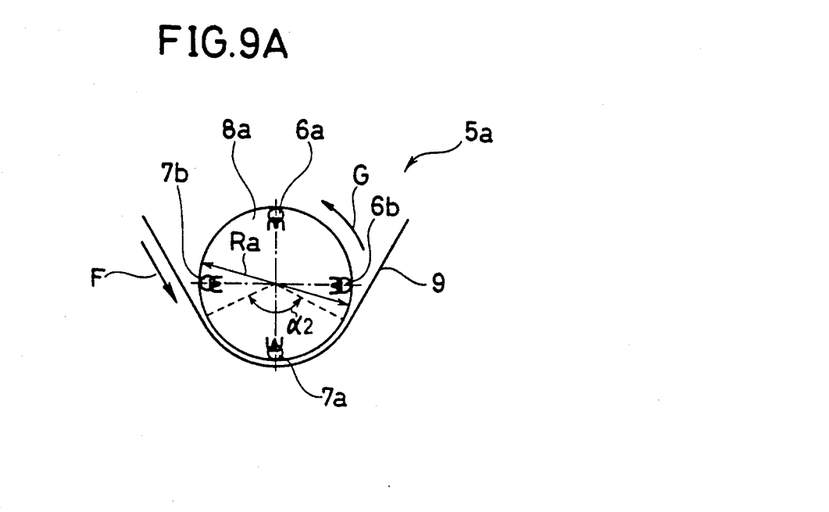
FIG. 9A is a diagram showing the schematic structure of a rotary head apparatus including a rotary drum having a diameter Ra.

It is now assumed that the diameter R0 of rotary drum 8 is decreased. FIG. 9A shows a rotary drum 8a having a diameter Ra two-thirds that of rotary drum 8 of FIG. 8A. When the rotating speed of rotary drum 8a is kept equal to that of rotary drum 8, the circumferential speed of rotary drum 8a decreases due to the reduction in diameter, and hence the tracing speed of magnetic heads 6a, 6b, 7a and 7b with respect to magnetic tape 9 decreases compared to the magnetic tape of rotary head apparatus 5 shown in FIG. 8A. That is, a distance that magnetic heads 6a, 6b, 7a and 7b trace on magnetic tape 9 is decreased. Thus, if the lap angle $\alpha 1$ of magnetic tape 9 is increased to a lap angle $\alpha 2$ as shown in FIG. 9A wherein the angle corresponds to a decrease in tracing speed, the distance for which each of magnetic heads 6a, 6b, 7a and 7b traces the magnetic tape 9 during one revolution of the rotary drum 8a can be kept equal to that in rotary drum 8. Accordingly, the lap angle $\alpha 2$ of magnetic tape 9 with respect to rotary drum 8a is selected to be 135°. However, even if the lap angle of the magnetic tape is increased, the tracing speed of each magnetic head is reduced as described above, so that a rotary head apparatus 5a of FIG. 9A cannot record information on magnetic tape 9 at the same density as rotary drum 8.

Thus, if the frequencies of slot clock signal C and read clock signal D of the data format generating circuit are lowered by a proportion corresponding to the decrease in diameter R0 without any change in synchronizing clock signal A of rotary head 8a and in sampling clock signal B of the A/D converter, rotary head apparatus 5a of FIG. 9A can perform recording/reproduction in the same recording format as in rotary head apparatus 5 of FIG. 8A. This makes it possible to reduce a reading speed at which data is read out of the memory without changing the rotating speed of rotary drum 8a and consequently generate a desired recording format in response to the changed clock slot signal C.

Figure 9B:
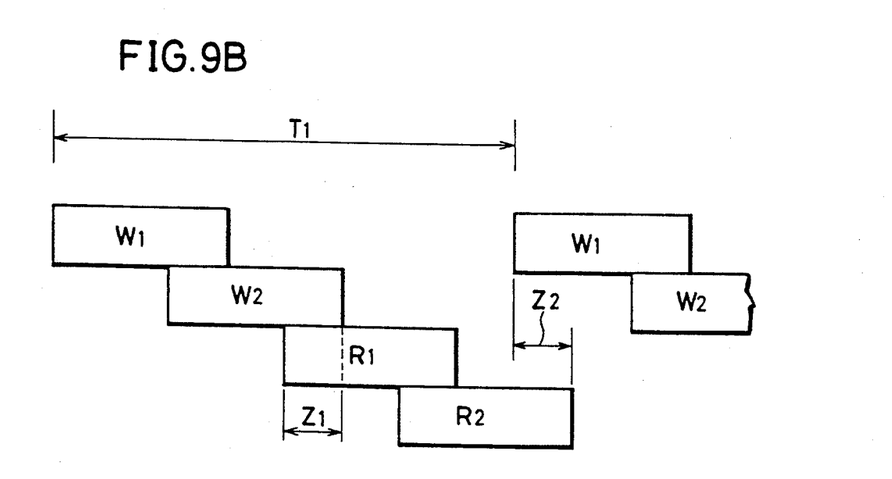
FIG. 9B is a diagram showing a tracing timing of the rotary head apparatus shown in FIG. 9A.

FIG. 9B shows the timing of each magnetic heads 6a, 6b, 7a and 7b tracing the magnetic tape 9 during one revolution of rotary drum 8a. As shown in FIG. 9A, when the mount angle between any adjacent magnetic heads is 90°, while the lap angle α2 of magnetic tape 9 is selected to be 135°, a preceding magnetic head tracing the magnetic tape 9 ends tracing after the succeeding magnetic head starts tracing. Accordingly, a recording period in which the signal is recorded and a reproducing period in which the signal is reproduced overlap with each other. FIG. 9B shows an overlapping period Z1 of recorded signal W2 and reproduced signal R1 and an overlapping period Z2 of recorded signal W1 and reproduced signal R2. In these overlapping periods Z1 and Z2, an S/N ratio (signal to noise ratio) of the reproduced signal is degraded due to cross talk in the recorded signal having a great signal strength.

Figure 10A:
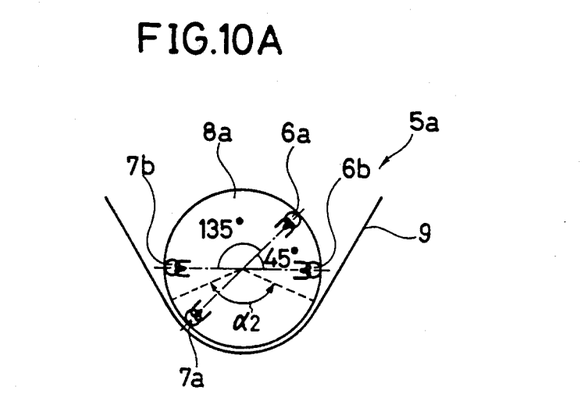
FIG. 10A is a diagram showing the schematic structure of the rotary head apparatus in which positions for mounting magnetic heads are altered.

In order to prevent cross talk, as shown in FIG. 10A, the mount angle between recording magnetic heads 6a and 6b disposed on rotary drum 8a and that between reproducing magnetic heads 7a and 7b are decreased. That is, since the lap angle α2 of magnetic tape 9 is selected to be 135° in FIG. 10A, 45° setting of the mount angle between any magnetic heads suppresses the generation of the overlapping periods of the recorded signal and the reproduced signal, as shown in FIG. 10B, so as to prevent cross talk.

Figure 10B:
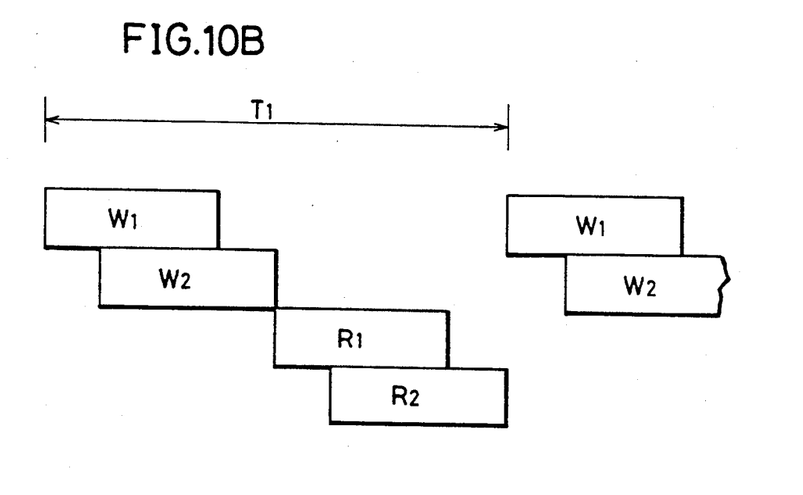
FIG. 10B is a diagram showing a tracing timing of the rotary head apparatus shown in FIG. 10A.

Meanwhile, the timing of each magnetic head tracing recorded signals W1 and W2 or reproduced signals R1 and R2, as shown in FIG. 10B, is controlled by a clock signal obtained based on a reference clock signal CK in each clock generating circuit 1 shown in FIG. 7 provided for each magnetic head.

In the conventional rotary head type magnetic tape recording and reproducing apparatus, if a rotary drum having a specific head position is designed, a clock generating circuit corresponding thereto must be designed separately. It is thus impossible to make an arbitrary alteration of head position of the rotary drum as far as the configuration of the clock generating circuit is not altered. In other words, if the clock generating circuit is designed with respect to a specific head position, it is impossible to alter timing for generating a clock signal in accordance with alteration of the head position of the rotary drum. Therefore, the conventional rotary head type magnetic tape recording and reproducing apparatus is unable to perform recording/reproduction using the same data format in accordance with the alteration of the head position of the rotary drum.

SUMMARY OF THE INVENTION

An object of the present invention is therefore to provide a rotary head type magnetic tape recording and reproducing apparatus capable of performing recording/reproduction always in the same data format, with respect to rotary heads having arbitrary head positions without reconstructing circuit configurations.

A rotary head type magnetic tape recording and reproducing apparatus according to the present invention includes coefficient setting means, first counter means, comparison means and timing signal generating means. The coefficient setting means sets a coefficient corresponding to a position of each magnetic head on a rotary drum. The first counter means counts a first clock signal to be a reference for a rotation control of the rotary drum. The comparison means compares the coefficient set by the coefficient setting means with a count value of the first counter means to detect a match between the coefficient and the count value. The timing signal generating means generates a timing signal for each magnetic head in response to a match detection outputted from the comparison means. The generated timing signal controls timing of a recording operation or a reproducing operation to be carried out by each magnetic head.

According to the present invention, even if a magnetic head position on the rotary drum is altered, alteration of a coefficient set by the coefficient setting means in accordance with the alteration of the head position results in a timing signal corresponding to the altered magnetic head position. This makes it possible to perform recording and reproduction always in the same data format, with respect to rotary heads having arbitrary head positions without altering circuit configurations.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 6(a through m) is a timing chart for explaining operation of the clock generating circuit shown in FIG. 1;

DESCRIPTION OF THE PREFERRED EMBODIMENTS

Figure 1:
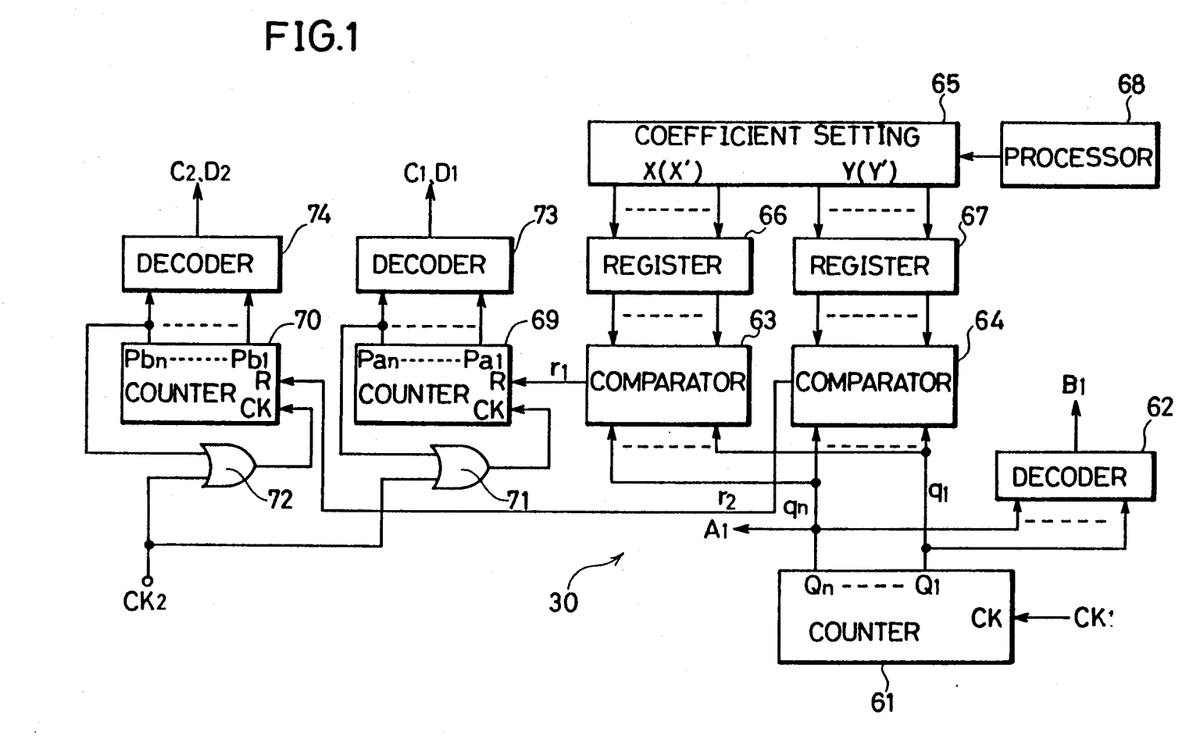
FIG. 1 is a block diagram showing an electrical configuration of a clock generating circuit employed in a rotary head type magnetic tape recording and reproducing apparatus according to one embodiment of the present invention.
Figure 2:
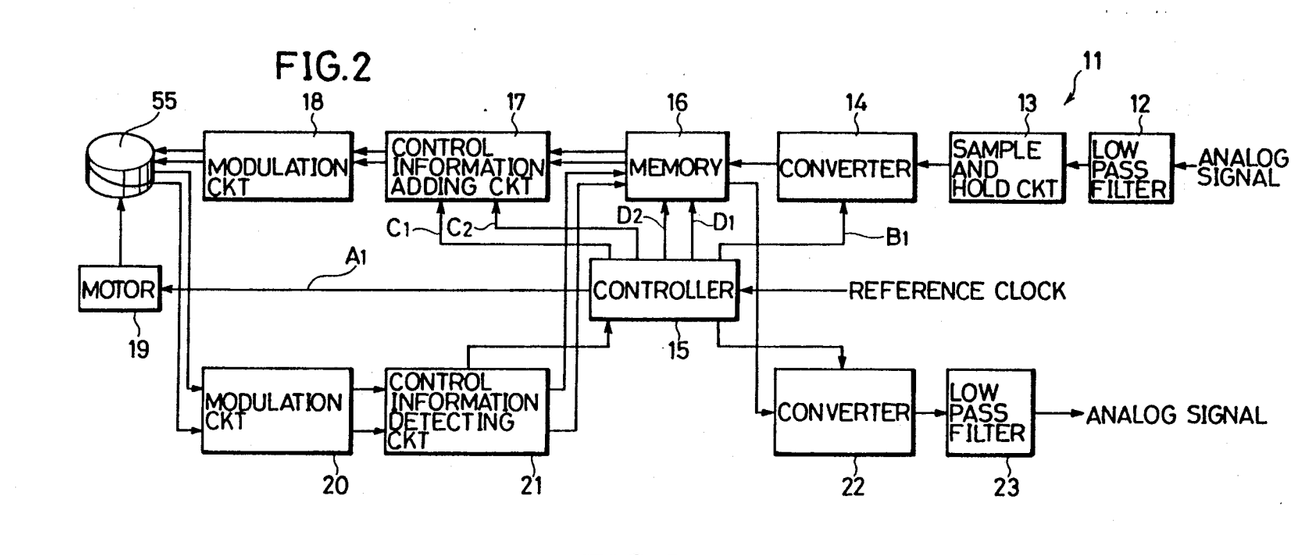
FIG. 2 is a block diagram showing an electrical configuration of the rotary head type magnetic tape recording and reproducing apparatus according to the embodiment of the present invention.

A clock generating circuit 30 shown in FIG. 1 is provided in a controller 15 in a rotary head type magnetic tape recording and reproducing apparatus 11 shown in FIG. 2.

A description will now be given for a structure of a recording system of rotary head type magnetic tape recording and reproducing apparatus 11 with reference to FIG. 2. An analog signal to be recorded has its high frequency components removed by a low-pass filter 12, then sampled by a sample-and-hold circuit 13 and applied to an A/D converter 14. In A/D converter 14, the sampled analog signal is converted to a digital signal in synchronization with a sampling clock signal B1 outputted from controller 15. This digital signal is written into a memory 16.

Memory 16 functions as a buffer for compressing in time the digital signal to be successively inputted from A/D converter 14 and then outputting a signal to be sequentially recorded on a magnetic tape 59. Data stored in memory 16 is read in response to read clock signals D1 and D2 being outputted from controller 15. That is, data of a signal W1 recorded by one magnetic head 56a, which will be described later, is read in response to one read clock signal D1, while data of a signal W2 recorded by the other magnetic head 56b, which will be described later, is read in response to the other read clock signal D2. The data read out of memory 16, to which control information is added by a control information adding circuit 17, is controlled to be of a predetermined data format, then modulated in a modulation circuit 18 and recorded on magnetic tape 59 through a rotary head apparatus 55. A data format generating circuit is constituted by memory 16 and control information adding circuit 17.

Control information adding circuit 17 is supplied with slot clock signals C1 and C2 being outputted from controller 15. The foregoing data format is based on slot clock signals C1 and C2 recorded by the control information adding circuit 17. That is, information is added to the data of signal W1 recorded by one recording magnetic head 56a in response to one slot clock signal C1, while information is added to the data of signal W2 recorded by the other recording magnetic head 56b in response to the other slot clock signal C2. Slot clock signals C1 and C2 are outputted in synchronization with read clock signals D1 and D2.

A motor 19 for driving rotary head 55 is supplied with a synchronizing clock signal A1 from controller 15. Rotary head 55 rotates in synchronization with synchronizing clock signal A1.

A description will now be given of a reproduction system of rotary head type magnetic tape recording and reproducing apparatus 11. A signal read from magnetic tape 59 by rotary head 55 is modulated by modulation circuit 20 to be of the data format formed in recording. Data including a variety of control information, a sound signal and so forth is detected in a control information detecting circuit 21. The detected data is written into memory 16. The data written in memory 16 is read out in sequence in response to a clock signal synchronized with a sampling frequency and is then reproduced as an analog signal through a digital/analog converter (hereinafter referred to as D/A converter) 22 and a low-pass filter 23.

Figure 3:
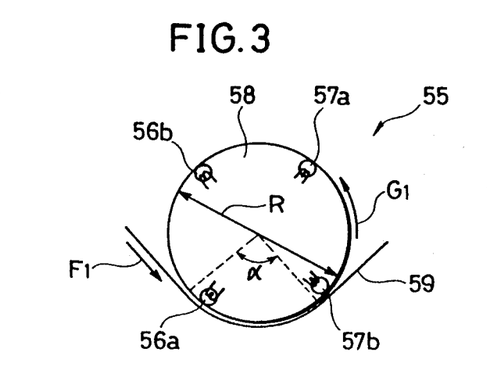
FIG. 3 is a diagram schematically showing the structure of a rotary head apparatus 55 shown in FIG. 2.

FIG. 3 is a diagram schematically showing the structure of rotary head apparatus 55. Referring to FIG. 3, a rotary drum 58 having a diameter R rotates in the direction of an arrow G1 at a rotating speed Vd, and magnetic tape 59 lapped around rotary drum 58 at a lap angle $\alpha$ moves in the direction of an arrow F1 at a moving speed Vt. Magnetic tape 59 is lapped around rotary drum 58 at an inclination $\theta$ to the plane of FIG. 3.

Plural pairs of the recording magnetic heads and reproducing magnetic heads are provided on rotary drum 58. That is to say, one recording magnetic head 56a is paired with one reproducing magnetic head 57a, while the other recording magnetic head 56b is paired with the other reproducing magnetic head 57b in FIG. 3. Reproducing magnetic head 57a is used as a monitor head for reproducing data recorded on magnetic tape 59 by recording magnetic head 56a immediately after the recording of the data, and then checking whether or not the data is recorded correctly. Similarly, reproducing magnetic head 57b is used as a monitor head corresponding to recording magnetic head 56b. In this embodiment, recording magnetic heads 56a and 56b are adjacent to each other, while reproducing magnetic heads 57a and 57b are adjacent to each other. Arbitrary alteration of a position where each magnetic head is to be mounted, i.e., a head position is available depending on applications or the like, and alteration of the size (diameter) of the rotary drum 58 is also available. A track pattern of record information to be recorded on magnetic tape 59 by rotary head apparatus 55 is shown in FIG. 4.

Figure 4:
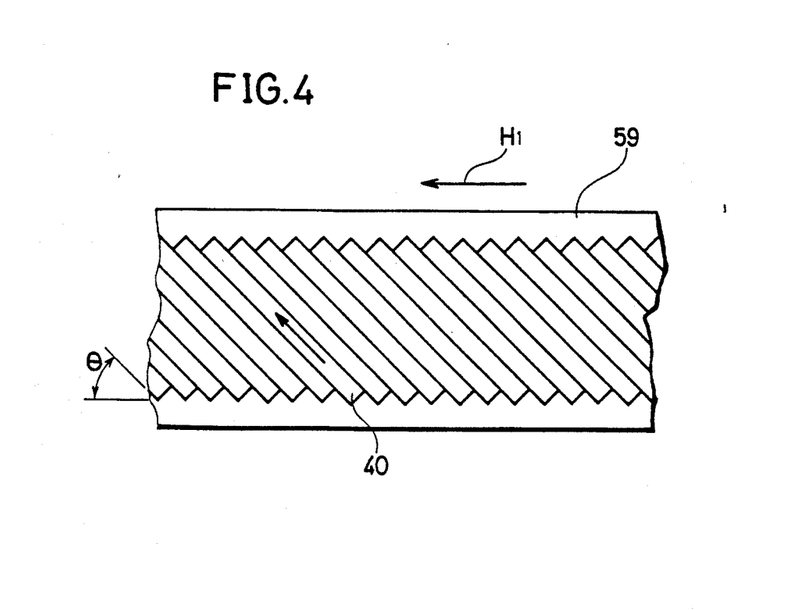
FIG. 4 is a diagram schematically showing a track pattern on a magnetic tape.

FIG. 4 is a diagram schematically showing a track pattern on magnetic tape 59. Magnetic tape 59 runs in the direction shown by an arrow H1 at a moving speed Vt. The moving speed Vt of magnetic tape 59 is set sufficiently lower than the rotating speed Vd of rotary drum 58. Accordingly, an inclination of each track 40 formed on magnetic tape 59 relative to the direction H1 in which magnetic tape 59 moves, i.e., a track angle is approximately equal to the inclination $\theta$ of magnetic tape 59. Each of tracks 40 on magnetic tape 59 is alternately recorded in sequence by two recording magnetic heads 56a and 56b mounted on rotary drum 58.

Figure 5:
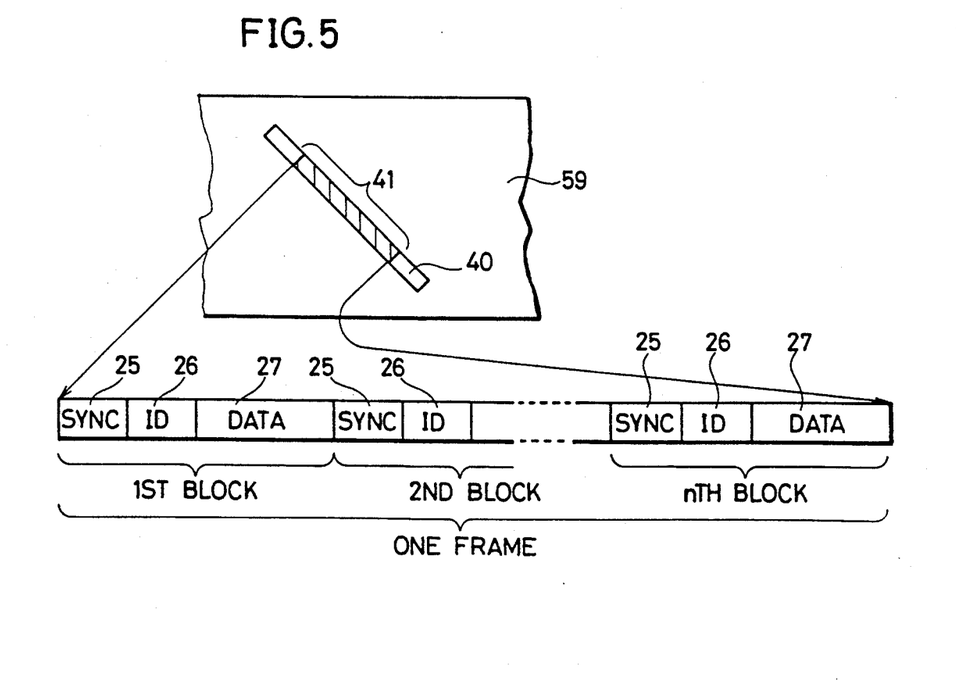
FIG. 5 is a diagram showing the configuration of a data area in a track.

FIG. 5 is a diagram showing the configuration of a data area 41. Each track 40 is provided with data area 41 in which digitized information is recorded. The digitized information is often recorded according to the above-described predetermined data format; e.g., such a data format as shown in FIG. 5 is employed. A digital signal to be recorded on track 40 comprises a plurality of blocks, each of which includes a synchronizing signal 25, an ID signal 26 and data 27. Synchronizing signal 25 is located at the tip end of each block and serves as a mark for use in reading data 27. ID signal 26 makes identification of data 27 and the like. The aforementioned plural blocks are arranged in sequence and stored in data area 41. In FIG. 5, one frame is formed of n blocks and stored in one data area 41.

A description will now be given a clock generating circuit 30 provided in rotary head type magnetic tape recording and reproducing apparatus 11 of FIG. 2 with reference to FIG. 1. Clock generating circuit 30 generates clock signals required for transmission of data to be recorded on magnetic tape 59 by recording magnetic heads 56a and 56b. For example, a first reference clock signal CK1 is inputted to a clock input terminal CK of a counter circuit 61 including an n-bit binary counter and the like. Counter circuit 61 counts the number of pulses of reference clock signal CK1 to output count signals q1-qn of n bits through n output terminals Q1-Qn. Count signals q1-qn are supplied to a decoder 62 and comparison circuits 63 and 64. A most significant bit signal qn to be outputted terminal Qn, i.e., a signal obtained by frequency-dividing first reference clock signal CK1 in the frequency dividing ratio of $2^n$ is supplied as synchronizing clock signal A1 of rotary head apparatus 55 to motor 19 (see FIG. 2). Decoder 62 decodes count outputs q1-qn of counter circuit 61 to output a clock signal B1 having a definite period. This clock signal B1 is supplied as a sampling clock signal to A/D converter 14. Two comparison circuits 63 and 64 compare count outputs q1-qn of counter circuit 61 with coefficients X and Y to be previously set through a coefficient setting circuit 65 in registers 66 and 67, respectively. When count outputs q1-qn of counter circuit 61 match coefficients X and Y, comparison circuits 63 and 64 output reset pulses r1 and r2 to counter circuits 69 and 70, respectively. That is, when the match between coefficient X and outputs q1-qn from counter circuit 61 is detected in comparison circuit 63, reset pulse r1 is outputted to counter circuit 69. When the match between coefficient Y and outputs q1-qn is detected in the other comparison circuit 64, reset pulse r2 is outputted to counter circuit 70.

Coefficient setting circuit 65 is connected to a processing circuit 68 including, for example, a microcomputer and the like. Values inputted by input means not shown are set as coefficients X and Y through processing circuit 68 in coefficient setting circuit 65. Alternatively, the values inputted from the input means may be subjected to a processing in processing circuit 68 in accordance with alteration in shape of drum 58 and in mounted position of each of magnetic heads 56a, 56b, 57a and 57b, and the processed values may be set as coefficients X and Y in coefficient setting circuit 65.

Counter circuits 69 and 70 count the number of pulses of a second reference clock signal CK2 to be inputted to their respective clock input terminals CK through OR circuits 71 and 72, respectively. Count outputs from n output terminals Pa1-Pan of one counter circuit 69 and those from n output terminals Pb1-Pbn of the other counter circuit 70 are supplied to decoders 73 and 74, respectively. Most significant bit signals from respective output terminals Pan and Pbn of counter circuits 69 and 70, i.e. signals obtained by frequency-dividing reference clock signal CK2 with a frequency dividing ratio of $2^n$, are also supplied to respective input terminals of OR circuits 71 and 72. Counter circuits 69 and 70 are reset by reset pulses r1 and r2 from comparison circuits 63 and 64, respectively. Respective gates of OR circuits 71 and 72 are open/close in response to outputs from output terminals Pan and Pbn. More specifically, when the outputs from output terminals Pan and Pbn are at a low level, reference clock signal CK2 passes through OR circuits 71 and 72 and then supplied to counter circuits 69 and 70. Accordingly, counter circuits 69 and 70 perform counting operation of reference clock signal CK2. When the outputs from output terminals Pan and Pbn are at a high level, outputs of OR circuits 71 and 72 are fixed at the high level, so that reference clock signal CK2 cannot pass through OR circuits 71 and 72. Accordingly, counter circuits 69 and 70 perform no counting operation.

Decoders 73 and 74 decode the count outputs of counter circuits 69 and 70, respectively, so as to output slot clock signals C1 and C2 which are employed when the synchronizing signal and the ID signal are added in the control information adding circuit 17 (see FIG. 2), respectively, and to output read clock signals D1 and D2 which are employed when the data stored in memory 16 are read, respectively.

In the above-described manner, the clock signals required for signal processings for each magnetic head provided on rotary drum 58, i.e., the clock signals required for the signal processings of signals W1 and W2 recorded by two recording magnetic heads 56a and 56b are formed by clock generating circuit 30 shown in FIG. 1. In that case, if the coefficients to be set by coefficient setting circuit 65 are altered in accordance with the alteration in shape of rotary drum 58 or in magnetic head position, clock generating circuit 30 is able to form clock signals having desired timings corresponding to the magnetic head positions. That is, in this embodiment, the recording operation in the same record format can be realized without the change in circuit configuration even though the shape of rotary drum 58 or the magnetic head position is changed.

Figure 6:
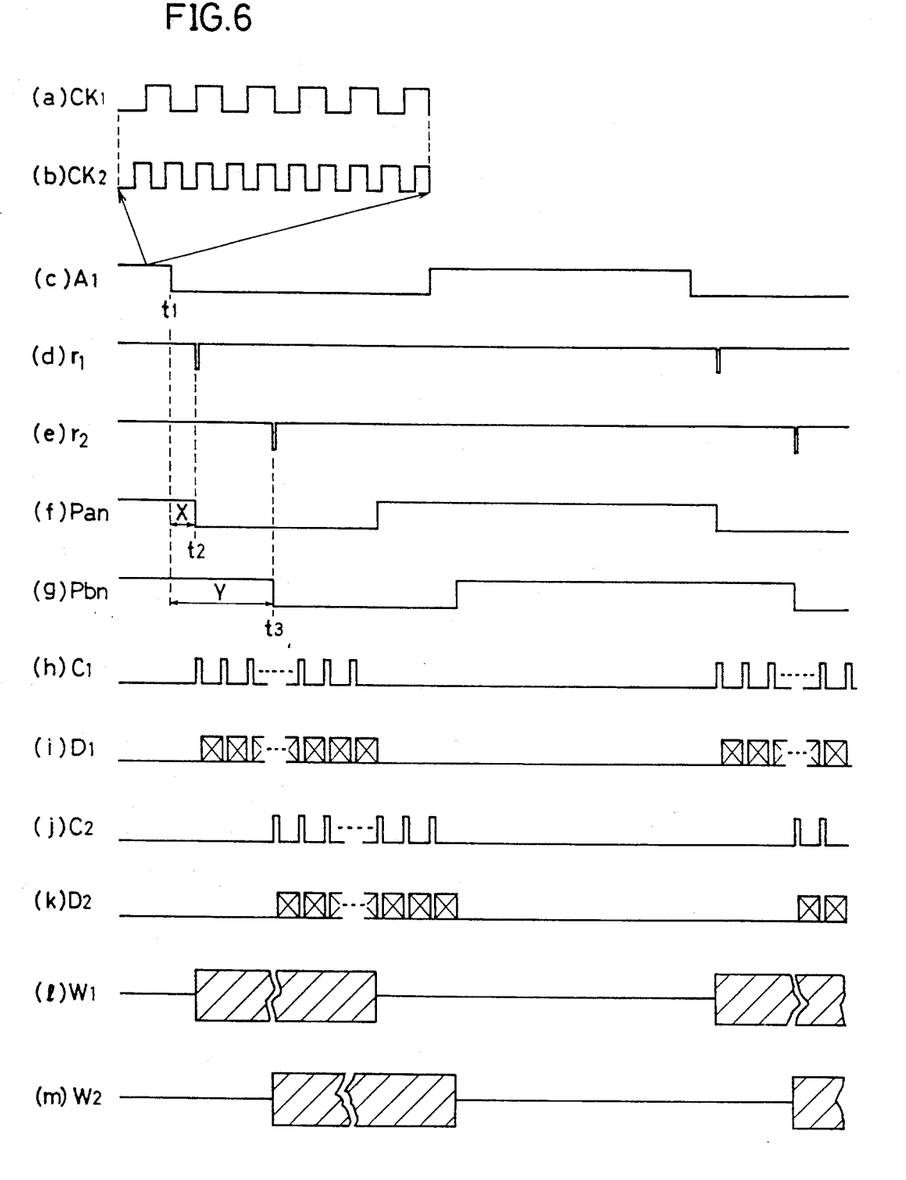

FIG. 6 is a timing chart for explaining operation of clock generating circuit 30. When first reference clock signal CK1 shown in FIG. 6 (a) is provided to clock input terminal CK of counter circuit 61, synchronizing clock signal A1 of rotary drum 58 shown in FIG. 6 (c) is outputted from output terminal Qn of counter circuit 61. Second reference clock signal CK2 shown in FIG. 6 (b) is employed as a transfer clock signal when rotary drum 58 has a small diameter.

Respective reset pulses r1 and r2 from comparison circuits 63 and 64 are low enabled pulses having narrow widths as shown in FIG. 6 (d) and (e). When corresponding counter circuits 69 and 70 are reset in response to reset pulses r1 and r2, outputs from respective output terminals Pan and Pbn of counter circuits 69 and 70 change to the low level as shown in FIG. 6 (f) and (g). Accordingly, reference clock signal CK2 is transmitted through OR circuits 71 and 72 to counter circuits 69 and 70. Consequently, counter circuits 69 and 70 start counting reference clock signal CK2. That is, a time period from a time t1 when synchronizing clock signal A1 changes from the high level to the low level to a time t2 when reset pulse r1 falls, in FIG. 6, corresponds to coefficient X to be set in one comparison circuit 63 in FIG. 1, while a time period from time t1 to a time t3 when the other reset pulse r2 falls corresponds to coefficient Y to be set in the other comparison circuit 64 in FIG. 1.

When counter circuits 69 and 70 start counting reference clock signal CK2, slot clock signals C1 and C2 and read clock signals D1 and D2 are outputted from corresponding decoders 73 and 74 in response to the count outputs of counter circuits 69 and 70, as shown in FIG. 6 (h) through (k). Memory 16 and control information adding circuit 17 form the data corresponding to one frame, i.e., n blocks shown in FIG. 5 in response to each clock signal. Finally, signal W1 recorded by recording magnetic head 56a and signal W2 recorded by recording magnetic head 56b are formed in modulation circuit 18, as shown in FIG. 6 (l) and (m). In this manner, the timing for formation of recorded signals W1 and W2 can be arbitrarily determined in accordance with alterations of coefficients X and Y to be set. Accordingly, selection of coefficients X and Y to appropriate values enables the timing for formation of signals W1 and W2 to coincide with the timing at which recording magnetic heads 56a and 56b trace on magnetic tape 59.

While the operation of the record system has mainly been described heretofore, employment of a clock generating circuit for reproduction having the same configuration as clock generating circuit 30 of FIG. 1 in the reproduction system makes it possible to control timing at which reproduced signals R1 and R2 are to be written in memory 16. In this case, coefficients corresponding to reproducing magnetic heads 57a and 57b are set in coefficient setting circuit 65 in the clock generating circuit for reproduction, and decoders 73 and 74 output write clock signals which are required in writing reproduced signals R1 and R2 into memory 16.

It is also possible to employ clock generating circuit 30 of FIG. 1 as the clock generating circuit for reproduction without separately providing the above-described reproduction clock generating circuit. In this case, coefficients X' and Y' corresponding to reproducing magnetic heads 57a and 57b as well as coefficients X and Y corresponding to recording magnetic heads 56a and 56b have previously been set in coefficient setting circuit 65. Coefficient setting circuit 65 sets these coefficients X' and Y' in registers 66 and 67 at timing at which reset pulses r1 and r2 shown in FIG. 6 (d) and (e) are outputted. When coefficients X' and Y' set in registers 66 and 67 match the count values of counter circuit 61, comparison circuits 63 and 64 again output reset pulses r1 and r2, and decoders 73 and 74 output write clock signals D1 and D2 in response to the output of reset pulses r1 and r2. Memory 16 accepts and stores therein reproduced signals R1 and R2 from control information detecting circuit 21 in synchronization with the outputted write clock signals. Similarly to the record system, the alteration of coefficients X' and Y' enables arbitrary selection of timing to write reproduced signals R1 and R2 into memory 16.

According to this embodiment, as has been mentioned above, the arbitrary setting of the coefficients in coefficient setting circuit 65 makes it possible to generate the clock signals required for the signal processings of the data to be recorded or reproduced by each magnetic head at arbitrary timing without changing the circuit configurations. Accordingly, the recording/reproducing operation can be achieved without generation of cross talk and always in the same record format despite the change in shape of the rotary drum and in head position.

While the description has been given of a structure that has two pairs of recording magnetic heads and reproducing magnetic heads, the number of pairs thereof is not limited to two.

As has been described in the foregoing, the present invention makes it possible to change the output of the second counter according to arbitrary head position without reconstructing the circuit configuration. This enables each head to perform the recording operation or reproducing operation at desired timing and in accordance with arbitrary head position, thereby to carry out the recording/reproducing operation in the same record format at all times.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A rotary head type magnetic tape recording and reproducing apparatus for recording a signal on a magnetic tape and reproducing the signal from the magnetic tape by employing a rotary device in which a plurality of magnetic heads for recording and a plurality of magnetic heads for reproduction, corresponding to the recording magnetic heads, are mounted on a rotary drum, comprising:

coefficient setting means for setting a coefficient corresponding to a position of each magnetic head on the rotary drum;

first counter means for counting a first clock signal to be a reference for rotational control of the rotary drum;

comparison means for comparing the coefficient set by said coefficient setting means with a count value of said first counter means to detect a match between the coefficient and the count value; and timing signal generating means, responsive to a match detection outputted from said comparison means, for generating a timing signal for each magnetic head;

said timing signal controls timing of a recording operation or a reproducing operation for each magnetic head.

2. The rotary head type magnetic tape recording and reproducing apparatus according to claim 1, wherein said timing signal generating means comprises:

second counter means, responsive to the match detection outputted from said comparison means, for starting counting a second clock signal; and decoding means for generating said timing signal by decoding a count value of said second counter means.

3. The rotary head type magnetic tape recording and reproducing apparatus according to claim 2, wherein said timing signal generating means further comprises:

means for stopping the counting operation of said second counter means when the count value of said second counter means reaches a predetermined value.

4. The rotary head type magnetic tape recording and reproducing apparatus according to claim 3, wherein said counting operation stopping means comprises:

gate means, responsive to a count output of said second counter means; for gating said second clock signal.

5. The rotary head type magnetic tape recording and reproducing apparatus according to claim 1, wherein a rotating operation of said rotary drum is controlled based on an output of said first counter means.

6. The rotary head type magnetic tape recording and reproducing apparatus according to claim 1, wherein said coefficient setting means enables alteration of said coefficient to be set to an arbitrary value.

* * * * *